May 12, 1953  R. B. COTTRELL  2,638,059
SNUBBED TRUCK

Filed Sept. 1, 1948  2 Sheets-Sheet 1

INVENTOR.
Robert B. Cottrell
BY

INVENTOR.
Robert B. Cottrell

Patented May 12, 1953

2,638,059

UNITED STATES PATENT OFFICE 2,638,059

SNUBBED TRUCK

Robert B. Cottrell, Chicago, Ill., assignor to American Steel Foundries, Chicago, Ill., a corporation of New Jersey Application September 1, 1948, Serial No. 47,279

11 Claims. (Cl. 105—197)

This invention relates to railway vehicles and more particularly to trucks provided with friction means for damping bolster oscillations.

The general object of the invention is to devise a truck incorporating snubbing means arranged to afford adequate control over vertical, lateral, longitudinal, as well as angling movements of the bolster.

A more specific object is to provide a truck having a side frame with a substantially vertical friction panel embraced between spaced legs of a bolster spring-supported on the frame, one of the legs directly engaging the panel and the other of the legs being provided with friction shoe means in wedge engagement therewith and in frictional engagement with the panel, said means comprising a pair of shoes spaced transversely of the side frame at opposite sides of the longitudinal center line thereof and each being actuated by spring means supported on the frame.

A further object is to provide a plurality of friction means of the type described so arranged that failure of one will not render the whole arrangement entirely inoperative.

The invention contemplates the provision of a side frame having oppositely facing friction surfaces disposed between spaced legs of a bolster, one of the legs directly engaging one of the surfaces and the other surface being engaged by friction devices comprising friction shoe means in wedge engagement with the other leg, the shoe means being actuated by substantially vertically disposed springs compressed thereagainst and against the frame, said friction devices and one leg being operative to develop increasing friction against respective surfaces during descent of the bolster and to develop decreasing friction when the bolster is ascending.

A further object is to provide a strong bolster construction by making the leg housing the friction shoes wider than the leg which carries the friction plate.

These and other objects of the invention will be apparent from the specification and the drawings, wherein.

Figure 2:
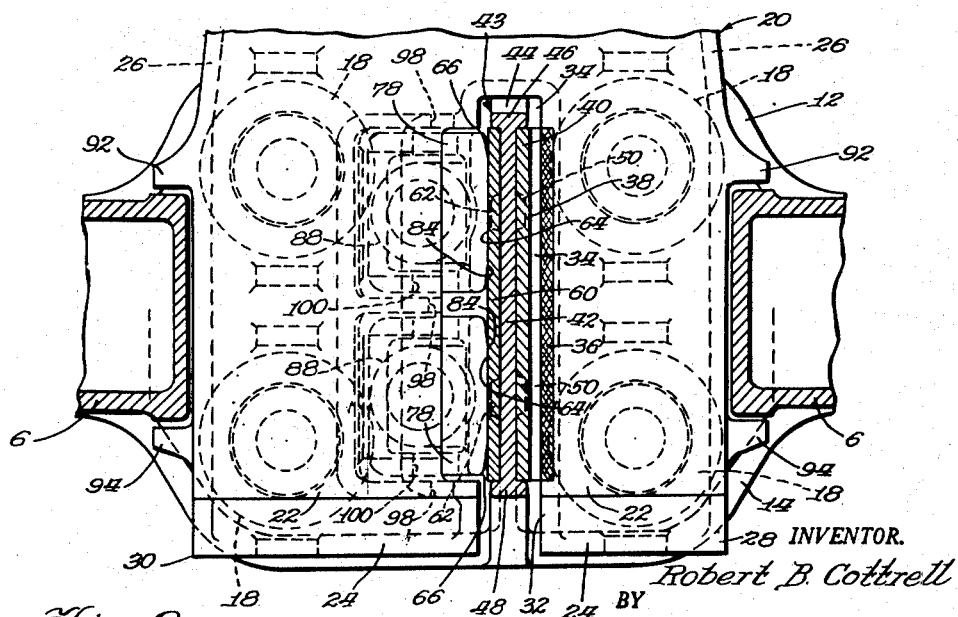
Figure 2 is a top plan view of Figure 1, partly in section, the section being taken substantially on the line 2—2 of Figure 1.

Describing the invention in detail, the truck structure includes a truss type side frame comprising tension and compression members 2 and 4 and spaced upright columns 6, 6 defining with said top and bottom or tension and compression members 2 and 4 a bolster opening 8 substantially centrally of the frame. The tension member 2 beneath the bolster opening is of box section and includes a widened top chord 10 formed with upstanding inboard and outboard flanges 12 and 14, and providing a spring seat as at 16 for the bolster-supporting springs 18, 18. The bolster-supporting or truck springs 18, 18 are arranged in two pairs at opposite sides of the transverse center line of the side frame, as best seen in Figure 2.

A truck bolster, generally designated 20, is seated on the springs within the bolster opening 8, said bolster 20 being of box section and comprising top and bottom walls 22 and 24 and spaced side walls 26, 26. The end portion of the bolster is bifurcated and comprises spaced legs 28 and 30.

Leg 28 comprises, in addition to walls 22, 24 and 26, a wall 32 on the side thereof adjacent leg 30, said wall 32 being provided with friction means in the form of a substantially vertical friction plate 34 extending with the wall 32 longitudinally of the bolster, said friction plate 34 being connected to leg 28 in any convenient manner although preferably by means of welds at 36, 36. Plate 34 presents a flat surface in engagement as at 38 with one side of a panel, and more specifically with a friction element 40 which in the present instance is illustrated as a substantially vertical wear plate mounted on a generally vertical wall 42 of a support generally designated 43, said wall extending transversely of the frame. Wall 42 is disposed at one side of the transverse center line of the side frame between the legs 28 and 30 of the bolster within an opening 44 (Figure 2) defined between said legs. The plate 40 is confined at its side edges between inboard and outboard ribs 46 and 48 formed on the lateral edges of the wall 42 and at its top and bottom edges is confined between outstanding lugs 50, 50 on wall 42. The plate 40 may be secured by welding to the support 43.

Figure 3:
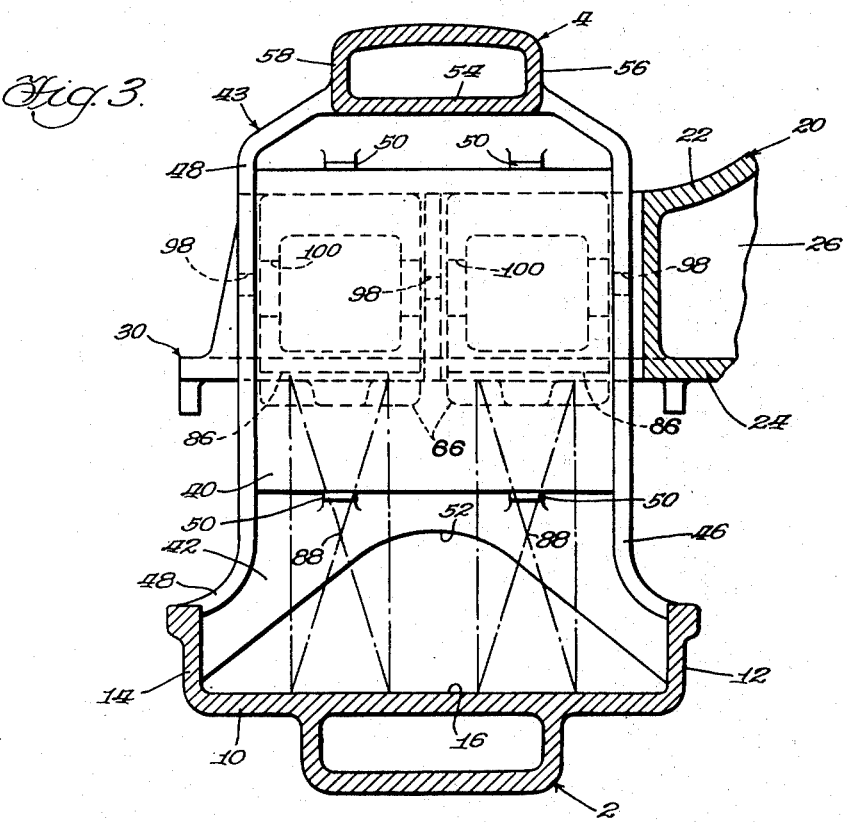
Figure 3 is a view taken substantially on the line 3—3 of Figure 1.

From a consideration of Figure 3, it will be noted that the wall 42 extends substantially the full width of the spring seat 16 and that the lower extremity of wall 42 is cored away as at 52 to lighten the structure and at the lower ends of its lateral edges merges with the inner sides of the respective flanges 12 and 14, and it will be observed that the ribs 46 and 48 together with the lateral edges of wall 42 flare outwardly in a downward direction, the ribs merging with the respective flanges 12 and 14. The upper extremity of wall 42 merges with the bottom web 54 of the box-section compression member 4, and the upper ends of the lateral edges of wall 42 are tapered so that the inboard and outboard ribs 46 and 48 are inclined towards each other at their upper extremities and merge with the inboard and outboard webs 56 and 58 of said compression member 4.

A friction plate 60 is mounted on the opposite side of wall 42, said plate being confined between the inboard and outboard ribs 46 and 48 and between the top and bottom lugs 62, 62 formed on the adjacent side of wall 42. Plate 60 may be additionally secured to wall 42 in any convenient manner, as, for example, by welding.

Figure 4:
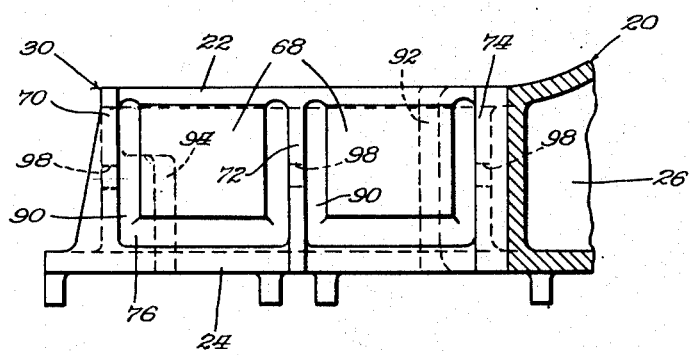
Figure 4 is a view taken approximately on the line 4—4 of Figure 1 with the friction shoes removed.

Plate 60 presents a substantially flat vertical friction surface extending transversely of the side frame and generally parallel to the friction surfaces on plates 34 and 40 and is engaged as at 64, 64 by a set of friction shoes, generally indicated 86, said shoes 66, 66 being spaced transversely of the side frame and in alignment with each other longitudinally of the bolster or transversely of the truck and being received within spaced pockets 68, 68 (Figure 4) provided in leg 30 of the bolster. The pockets 68, 68 are defined by substantially vertical parallel walls or webs 70, 72 and 74 extending transversely of the bolster and spaced longitudinally thereof. The inboard and outboard webs 74 and 70 and the intermediate web 72 merge at their upper and lower extremities with the top and bottom walls 22 and 24 of leg 30 and at their rear extremities merge with a substantially diagonal wall 76 sloping upwardly toward the adjacent side of wall 42.

Figure 1:
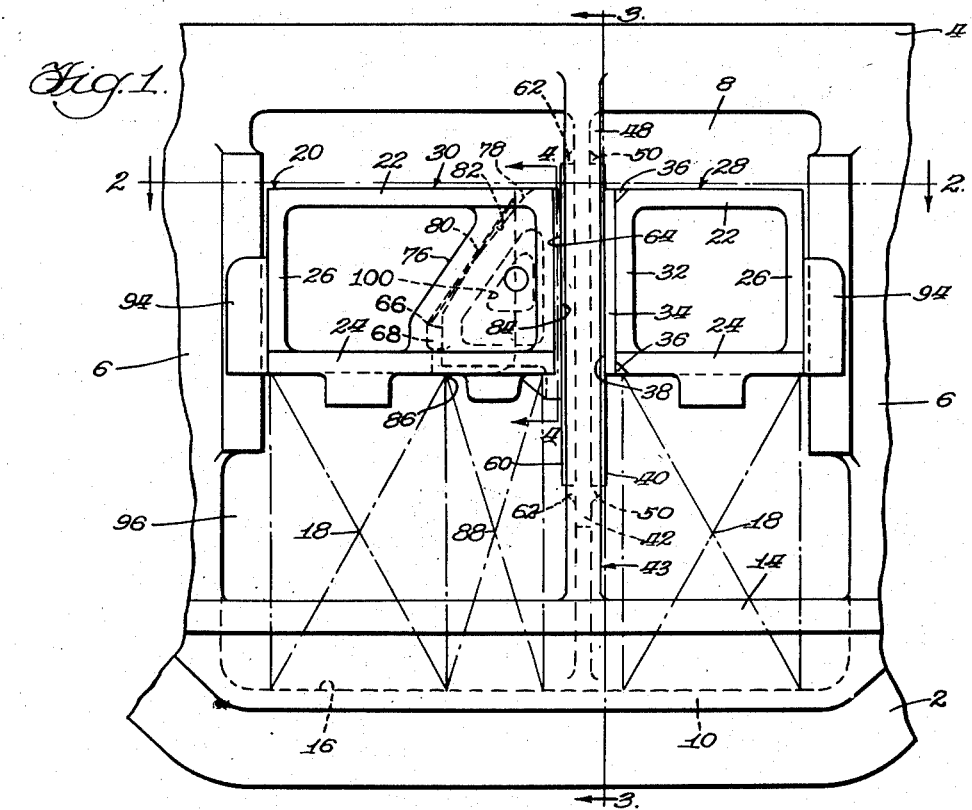
Figure 1 is a fragmentary side elevation of a truck structure embodying the invention.

Each shoe, as best seen in Figure 1, is of triangular configuration in side elevation and presents an upwardly sloping curved or crowned diagonal surface as at 78 which engages as at 80 with a curved or crowned surface 82 on the associated portion of wall 76. Each shoe also presents a substantially vertical surface 84 which engages the before-mentioned friction plate 60 as at 64. Each shoe also presents on the bottom thereof a spring seat 86 against which is seated the upper end of a substantially vertical coil spring 88, the lower end of said coil spring 88 being seated on seat 16 of the tension member.

It will be readily apparent from a consideration of Figures 1 and 2 that the bolster leg 30 is much wider than bolster leg 28 in view of the fact that the friction shoes 66, 66 are pocketed in leg 30. This arrangement affords sufficient space for seating springs 18, 18 against the underside of leg 30, as may readily be observed by consideration of Figure 2. It will be observed that pockets 68, 68 are cored away at their corners as at 90 in order to insure that the shoes will be afforded a proper fit therein.

In operation, the springs 88, 88 urge the shoes 66, 66 into wedge engagement with the leg 30 by engaging the surfaces 78 of the shoes with surfaces 82 on wall 76 within the respective pockets. Each spring 88, urging the related shoe upwardly, causes the shoe to slide toward the friction plate 60. The pressure of the shoe causes the bolster to move transversely and to engage friction plate 34 on leg 28 with wear plate 40. Downward movement of the bolster causes compression not only of springs 18, 18 but also of springs 88, 88, thus urging the shoes 66, 66 under increasing pressure against the bolster and also against the plate 60 whereby a greater amount of friction is developed between shoes 66, 66 and plate 60 and between plates 32 and 40.

Transverse or lateral movement of the bolster in one direction is resisted by both of the shoes 66, 66 and in the opposite direction is limited by engagement of leg 28 with the adjacent side of the friction member. It will be appreciated that failure of either shoe to function will not render the arrangement wholly inoperative inasmuch as each shoe is independent of the other; however, they do cooperate to provide unified control over angling, lateral, longitudinal and vertical movements of the bolster. It will be seen that the inboard and outboard friction shoes as shown in Figure 2 are disposed substantially equal distantly at opposite sides of the longitudinal vertical center plane of the side frame.

The legs 28 and 30 are provided on their remote sides with inboard and outboard guide lugs or gibs 92 and 94 embracing the associated column 6 therebetween. For purposes of assembly and disassembly the outboard lugs 94 are of less depth than the widened lower portion 96 of the bolster opening whereby the bolster is accommodated during assembly and disassembly with respect to the side frame.

The shoes are retained in the bolster during assembly by a pin (not shown) inserted into the aligned openings 98 in walls 70, 72 and 74 and openings 100 in the respective shoes.

The arrangement described affords a compact structure providing sufficient space for the truck springs. The friction means serve as squaring instrumentalities in addition to controlling various bolster movements. Of course, only one shoe could be used in lieu of the two shown; however, with two shoes better control is afforded over angling and lateral movements of the bolster as well as any rotational movement thereof relative to the friction panel or element. By reference to Figure 2 it will be readily appreciated that the elastic pressure exerted by the friction shoes against the friction plate 60 will cause leg 28 of the bolster to maintain constant engagement with the wear plate 40, as hereinbefore specifically recited. As result of this continuously applied pressure horizontal angular motion of the bolster will be fulcrumed along the outboard or inboard edge of the plate 40, as the motion is clockwise or counterclockwise, respectively. The multiple shoe arrangement more effectively controls this angular motion. As the relative motion of the bolster is clockwise about the fulcrum approximately located along the outer edge of the plate 40, the substantial burden of resisting said motion is absorbed by the inboard shoe, and this resistance is materially increased by the mechanical advantage obtained as a result of the application of the resisting force at a point substantially spaced from the fulcrum point. The same result follows as the motion were counterclockwise, except that inboard edge of the plate 40 is the fulcruming point and the diagonally located outboard shoe applies the resisting pressure.

I claim:

1. In a railway car truck, a side frame comprising spaced columns disposed at opposite sides and substantially equally spaced from the transverse vertical center plane of the frame, a friction panel between said columns disposed at one side of said plane, a bolster having a pair of legs in longitudinal alignment with the bolster, one of said legs being narrower than the other, the narrower leg extending between said panel and the column on the same side of said plane and frictionally engaging the adjacent side of said panel, the wider leg extending between said panel and the column at the opposite side of said plane, the wider leg having a plurality of friction shoe pockets spaced longitudinally of the bolster, a wedge surface in each pocket sloping toward said panel, a shoe in each pocket in wedge engagement with the wedge surface therein and in frictional engagement with the adjacent side of the panel, actuating springs for said shoes positioned adjacent said panel between the same and said last-mentioned column and compressed between respective shoes and a portion of the frame spaced vertically with respect to the bolster, and bolster-supporting springs between each leg and a portion of the frame therebelow, the bolster-supporting springs associated with the wider leg being located between said actuating springs and said last-mentioned column.

2. In a railway car truck, a side frame comprising a substantially vertical friction panel presenting friction surfaces on opposite sides thereof extending transversely of the frame, a relatively movable member spring-supported from said frame and comprising a bifurcated end portion with spaced legs at opposite sides of said panel, one of said legs directly engaging one of said panel surfaces, friction shoe means in wedge engagement with the other leg and in frictional engagement with the other panel surface, and resilient means reacting between said shoe means and said frame, said shoe means comprising a pair of shoes disposed respectively at opposite sides of the vertical plane bisecting said frame longitudinally, said one leg being adapted to fulcrum against the inboard and outboard edges of said panel during rotational movement of said bolster upon upwardly and downwardly extending axes, and said shoes being arranged to selectively resist said movement in a mechanically advantageous manner.

3. In a railway car truck, a side frame having a substantially vertical friction panel presenting friction surfaces at opposite sides thereof extending transversely of the frame, a bolster having an end portion with spaced legs disposed at opposite sides of the panel, one of said legs directly engaging the adjacent friction surface, a pair of friction shoes arranged side by side and spaced transversely of the frame and in wedge engagement with said other leg along surfaces sloping toward said panel and in frictional engagement with the adjacent friction surface, and a spring compressed between each shoe and a portion of the frame spaced vertically with respect to the bolster, said bolster being rotatable on an upright axis a limited amount with respect to the panel and in rotating fulcruming against the inboard or outboard edge of the panel as the rotation is counterclockwise or clockwise, respectively, and each shoe being arranged to present a mechanically increased resistive force when said rotation is about the fulcrum point diagonally located relative to said shoe.

4. In a railway car truck, a side frame member comprising spaced columns and a substantially vertical friction element between said columns presenting friction surfaces on opposite sides thereof extending transversely of the frame, a flexibly supported bolster member having a leg at one side of said element in engagement with the adjacent surface and having another leg at the opposite side of the element provided with pockets spaced transversely of the frame, a shoe in each pocket in wedge engagement with a surface therein sloping upwardly toward said element, each shoe frictionally engaging the element, and shoe actuating spring means compressed between said shoes and one of said members for urging the shoes into said engagement, said element being wider transversely of the frame than said column and said shoes being disposed at opposite sides of a vertical plane bisecting said frame longitudinally, said element being disposed at one side of a vertical plane bisecting said frame transversely, said one leg of said bolster member being narrower than the other leg thereof and each leg presenting a spring seat adjacent each column of substantially equal extent and springs compressed between said seats and said frame.

5. In a railway car truck, a truss type side frame comprising a substantially vertical panel presenting friction surfaces on opposite sides thereof, a bolster spring-supported from the frame and having a bifurcated end portion comprising spaced legs receiving said panel therebetween, one leg directly engaging one panel surface, a set of shoes spaced transversely of the frame frictionally engaging the other surface and in wedge engagement with the other leg, and spring means compressed between the frame and each of said shoes, the shoes being disposed adjacent to the inboard and outboard edges of the panel and independently actuated and said one leg being adapted to fulcrum against the panel in areas at said inboard and outboard edges of the panel under horizontal rotational impulse of said bolster, whereby the shoe adjacent the inboard edge is mechanically advantageously effective to impede bolster rotation in the clockwise direction and the shoe adjacent the outboard edge has like effect relative to bolster rotation in the counterclockwise direction.

6. In a railway car truck, a side frame comprising tension and compression members, a friction panel therebetween comprising a wall formed integral with said members, friction surfaces carried on opposite sides of said wall, a bolster having a pair of legs disposed at opposite sides of said panel, one of said legs engaging the adjacent surface, spaced shoes pocketed in the other leg and in wedge engagement therewith and in frictional engagement with the adjacent surface, resilient means compressed between each shoe and said tension member, and bolster-supporting springs compressed between each leg and said tension member, said springs being substantially equidistantly spaced laterally of the bolster from the longitudinal center line of the bolster.

7. A side frame comprising tension and compression members and spaced columns merging with said members and defining a bolster opening therewith, said tension member beneath said opening being widened transversely of the frame to provide a spring seat, inboard and outboard flanges on said tension member, a friction panel within said opening comprising an upright wall connected at its lower end to said flanges and at its upper end to said compression member, friction surfaces carried on opposite sides of said wall, said columns being disposed at opposite sides and substantially equidistantly spaced from a vertical plane bisecting said frame transversely, and said panel being disposed at one side of said plane.

8. A bolster comprising spaced substantially parallel legs defining an opening therebetween disposed at one side of a vertical plane bisecting said bolster longitudinally, one of said legs carrying a friction surface facing the other leg, the other leg comprising pockets open to said opening and through the bottom of said leg, and a wedge surface in each pocket on said other leg angularly related with respect to said friction surface, each leg presenting on the bottom thereof a spring seat spaced laterally of said plane, the spring seats on respective legs being of substantially the same width and spaced substantially equidistantly from said plane.

9. A bolster having a bifurcated end portion comprising spaced legs defining an opening therebetween at one side of the longitudinal center line of the bolster, one of said legs being wider than the other and having friction shoe pockets at one side of said opening, a friction plate rigidly fixed with respect thereto said other leg at the opposite side of said opening, and spring seat areas on the bottom of said legs of substantially the same extent and spaced substantially equal distances from the vertical longitudinal center plane of the bolster.

10. In a railway car truck, a side frame comprising tension and compression members, a friction element therebetween and formed integral with said members, friction surfaces on opposite sides of said element, a bolster having spaced portions disposed at opposite sides of said element, one of said portions directly engaging the adjacent surface, spaced shoes pocketed in the other leg and in wedge engagement therewith and in frictional engagement with the adjacent surface, resilient means compressed between each shoe and one of said members and bolster supporting springs compressed between each leg and said tension member, said springs being substantially equidistantly spaced laterally of the bolster from the longitudinal center line of the bolster.

11. A side frame comprising tension and compression members and spaced columns merging with said members and defining a bolster opening therewith, said tension member beneath said opening providing a spring seat, a friction element within said opening and disposed between said columns and connected to at least one of said members and presenting friction surfaces on opposite sides thereof, said columns being disposed at opposite sides and substantially equidistantly spaced from a vertical plane bisecting said frame transversely, and said element being disposed at one side of said plane.

ROBERT B. COTTRELL.

References Cited in the file of this patent

UNITED STATES PATENTS

| Number | Name | Date |
|---|---|---|
| 2,395,317 | Cottrell | Feb. 19, 1946 |
| 2,444,009 | Grigsby | June 22, 1948 |
| 2,446,506 | Barrett et al. | Aug. 3, 1948 |
| 2,516,072 | Piron | July 18, 1950 |